(12) United States Patent
Kapadia et al.

(10) Patent No.: US 9,183,322 B2
(45) Date of Patent: Nov. 10, 2015

(54) INCREASING INTERNET PROTOCOL VERSION 6 HOST TABLE SCALABILITY IN TOP OF RACK SWITCHES FOR DATA CENTER DEPLOYMENTS

(71) Applicant: Cisco Technology, Inc., San Jose, CA (US)

(72) Inventors: Shyam Kapadia, Santa Clara, CA (US); Ming Zhang, San Jose, CA (US); Nilesh Shah, Fremont, CA (US); Putu Harry Subagio, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 13/693,090

(22) Filed: Dec. 4, 2012

(65) Prior Publication Data

US 2014/0156667 A1 Jun. 5, 2014

(51) Int. Cl.
*G06F 17/30* (2006.01)

(52) U.S. Cl.
CPC .......... *G06F 17/30946* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 6,092,061 | A * | 7/2000 | Choy | 1/1 |
| 2002/0129086 | A1 * | 9/2002 | Garcia-Luna-Aceves et al. | 709/200 |
| 2003/0182291 | A1 * | 9/2003 | Kurupati et al. | 707/100 |
| 2004/0008675 | A1 * | 1/2004 | Basso et al. | 370/389 |
| 2005/0018645 | A1 * | 1/2005 | Mustonen et al. | 370/349 |
| 2006/0106940 | A1 * | 5/2006 | Jagannathan et al. | 709/238 |
| 2006/0209885 | A1 | 9/2006 | Hain et al. | |
| 2007/0088909 | A1 | 4/2007 | Krishnan et al. | |
| 2007/0091899 | A1 | 4/2007 | Ward et al. | |
| 2008/0120428 | A1 * | 5/2008 | Khan et al. | 709/230 |
| 2008/0244170 | A1 | 10/2008 | Pani | |
| 2012/0127999 | A1 * | 5/2012 | Grosser et al. | 370/392 |
| 2013/0077530 | A1 | 3/2013 | Zhang et al. | |
| 2014/0023080 | A1 | 1/2014 | Zhang et al. | |

OTHER PUBLICATIONS

Hinden, Robert M., and Stephen E. Deering. "Internet protocol version 6 (IPv6) addressing architecture." (2003).*
Crawford, Matt. "Transmission of IPv6 packets over ethernet networks." (1998).*

* cited by examiner

*Primary Examiner* — Robert Beausoliel, Jr.
*Assistant Examiner* — Pedro J Santos
(74) *Attorney, Agent, or Firm* — Edell, Shapiro & Finnan, LLC

(57) ABSTRACT

Techniques are provided for optimizing storage of address information in switch device databases. A control packet is received from a source host. An address associated with a host is determined. The address comprises a first and second address component. The first address component is stored in a first database and is mapped to an index value that is stored in the first database. The index value is also stored in a second database along with the second address component. The first database may also be examined to determine whether the first address component is stored in the first database. If the first address component is stored in the first database, the index value mapped to the first address component is retrieved. The second database is examined to determine whether the index value and the second address component are stored in the second database.

14 Claims, 6 Drawing Sheets

INCREASING INTERNET PROTOCOL VERSION 6 HOST TABLE SCALABILITY IN TOP OF RACK SWITCHES FOR DATA CENTER DEPLOYMENTS

TECHNICAL FIELD

The present disclosure is a solution that relates to optimizing storing of host address information in switch device databases.

BACKGROUND

In data center environments, rack units may house many server devices. Each server device may be configured to host one or more physical or virtual host devices. The servers in the rack units are connected to Top of Rack (ToR) switch devices. The ToR switches, in turn, are connected to other ToR switches via a spine switch or spine fabric. Data communications may be exchanged between host devices (physical and/or virtual) in different rack units. For example, packets of data communications may be sent from a virtual host device in one rack unit to a virtual host device in another rack unit. These packets may be routed between corresponding ToR switch devices and the spine switch. The ToR switches are configured to store address information associated with the host devices in the data center environment.

DESCRIPTION OF EXAMPLE EMBODIMENTS

Overview

Techniques are provided for optimizing storage of address information in switch device databases. These techniques may be embodied as a method, apparatus and instructions in a computer-readable storage media to perform the method. At a switch device in a network, a neighbor advertisement packet is received from a source host in the network. An address associated with a host in the network is determined from the packet. The address comprises a first address component and a second address component. The first address component is stored in a first database of the switch device, and the first address component is mapped to an index value. The index value is stored in the first database of the switch device. The index value is also stored in a second database of the switch device along with the second address component.

Additionally, the first database of the switch device may be examined to determine whether the first address component of a target host address is stored in the first database. If the first address component is stored in the first database, the index value that is mapped to the first address component is retrieved from the first database. The second database is examined to determine whether the index value and the second address component are stored in the second database.

Example Embodiments

Figure 1:
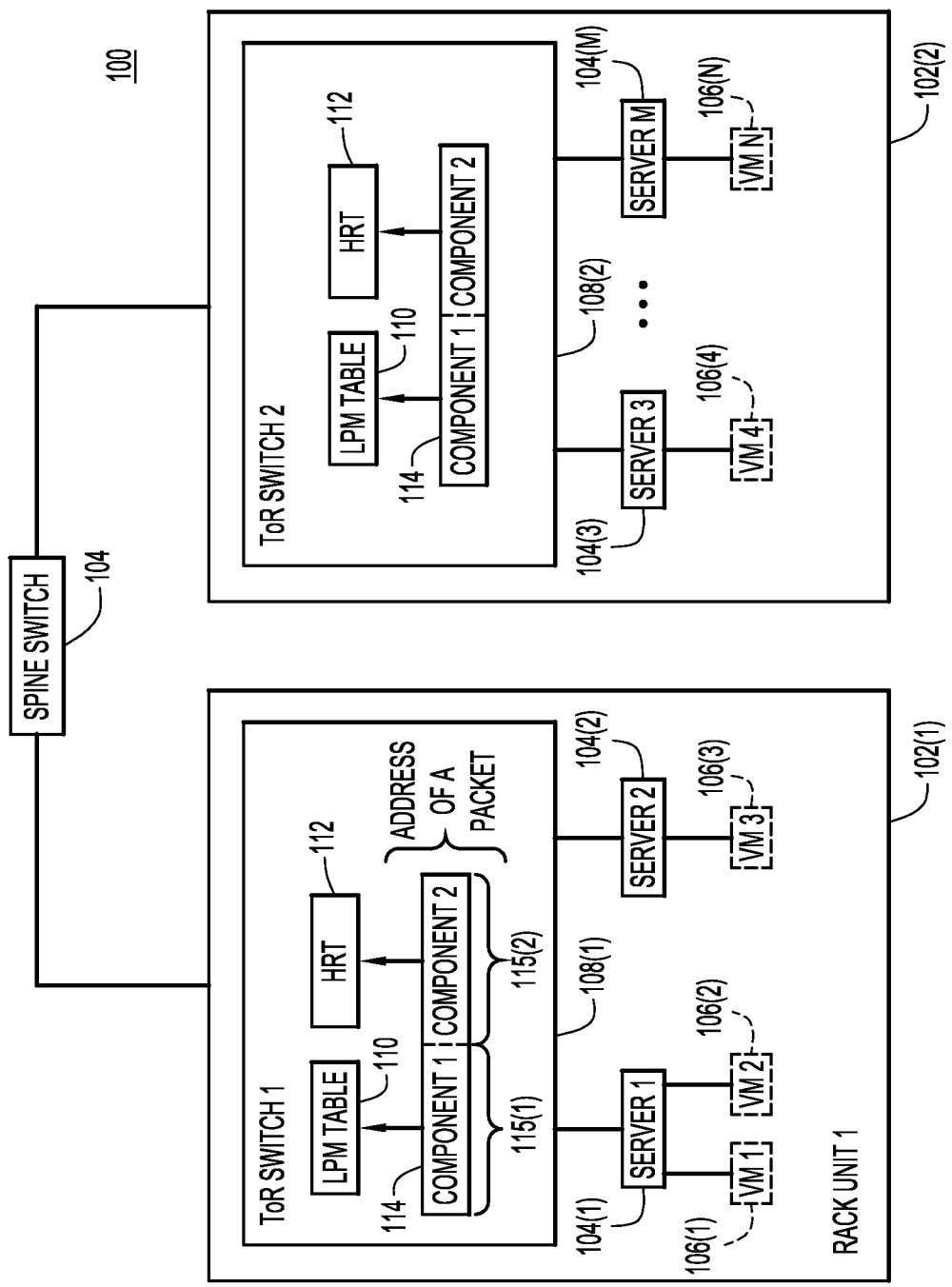
FIG. 1 shows an example data center environment including a plurality of rack units that each host servers and one or more switch devices that store host device address information.

The techniques described herein relate to optimizing storage of host address information in switch device databases. An example data center environment (e.g., "network") 100 is illustrated in FIG. 1. FIG. 1 shows two rack units (or "racks") in the network 100 at reference numerals 102(1) and 102(2). Rack unit 102(1) may be referred to hereinafter as "rack unit 1" and rack unit 102(2) may be referred to hereinafter as "rack unit 2."

Each of the rack units is configured to host one or more server devices ("servers"). The servers are depicted at reference numerals 104(1)-104(m). Server 104(1) may be referred to hereinafter as "server 1," server 104(2) may be referred to hereinafter as "server 2," and so on. The servers 104(1)-104(m) may be arranged in one or more local area network (LANs). For example, all of the servers 104(1)-104(m) (or a subset of the servers) may be arranged in the same LAN, or the servers 104(1)-104(m) may each be arranged in a different LAN.

The servers 104(1)-104(m) are physical servers that are configured to exchange data communications with each other in the network 100. Each of the servers 104(1)-104(m) is configured to host one or more host devices. These host devices may be physical or virtual network devices that are configured to communicate with each other within the network 100. In FIG. 1, the host devices are depicted as virtual machines at reference numerals 106(1)-106(n), though it should be appreciated that the communication techniques described herein may apply to physical host devices as well as the virtual machines. Virtual machine 106(1) may be referred to hereinafter as "virtual machine 1" or "VM 1," virtual machine 106(2) may be referred to hereinafter as "virtual machine 2" or "VM 2," and so on.

Each of the rack units 102(1) and 102(2) also has a switch device (referred to hereinafter as a "switch," "top of rack switch" or "ToR switch"). These switch devices are shown at reference numerals 108(1) and 108(2). Switch device 108(1) belongs to rack unit 1 and may be referred to herein as "switch 1" or "ToR switch 1." Likewise, switch device 108(2) belongs to rack unit 2 and may be referred to herein as "switch 2" or "ToR switch 2." ToR switch 1 and ToR switch 2 each has a first database and a second database. FIG. 1 shows the first database at reference numeral 110 in ToR switch 1 and shows the second database at reference numeral 112 in ToR switch 1. It should be appreciated that these databases may also be present in ToR switch 2; for simplicity, the databases are shown only in ToR switch 1.

The first database 110 and the second database 112 of ToR switch 1 are configured to store components of address information of the host devices (e.g., the virtual machines 106(1)-106(n)), as described by the techniques herein. For example, FIG. 1 shows an address of a host device at reference numeral 114 with a first component ("component 1") 115(1) and a second component ("component 2") 115(2). As shown and described by the techniques herein, the first component 115 (1) may be stored in the first database 110 and the second component 115(2) may be stored in the second database 112. The first database 110 may be referred to as a "longest prefix match table" or "LPM" table, and the second database 112 may be referred to as a "host routing table" or "HRT."

ToR switch 1 and ToR switch 2 are connected to a central switch device, which is shown at reference numeral 109. The central switch device 109 may be arranged in a "spine" configuration, and accordingly, the central switch device 109 is referred to as a "spine switch" in FIG. 1. The host devices in the network are configured to communicate with the ToR switches. For example, VM 1 will send a control packet to ToR switch 1 that informs ToR switch 1 of the address information associated with VM 1. In this example, VM 1 may exchange Address Resolution Protocol or ARP (e.g., ARP version 4 or ARP version 6) neighbor discovery packets such that ToR switch 1 is informed of the host devices and virtual machines that it manages. Upon exchanging these neighbor discovery packets, the ToR switch 1 may store components of the address associated with the host devices and the virtual machines based on the techniques described herein. Control packets may be exchanged between other virtual machines/host devices and ToR switches in a similar manner.

Additionally, after the control packets have been exchanged between the virtual machines and the ToR switches, the host devices may send data communications to one another. For example, VM 1 in rack unit 1 may exchange communications with VM 4 in rack unit 2 by exchanging data packets between server 1 (that hosts VM 1) and server 3 (that hosts VM 4) via the ToR switch 1, spine switch and ToR switch 2. In one example, VM 1 may send packets that have a source target address (e.g., an Internet Protocol (IP) address) associated with the source host (VM 1) and a target address (e.g., an IP address) associated with the destination host (VM 4). As described by the techniques herein, upon receiving the packet, ToR switch 1 may analyze the packet to determine the target address, the components of which have been stored in the LPM table and the HRT during the exchange of control messages. For example, during the exchange of the control messages, the information in the LPM table and the HRT are installed, for example, by a routing protocol, and the information in these tables is used for Layer 3 look-up when data packets are received by the ToR switches from one or more of the host devices.

Figure 2:
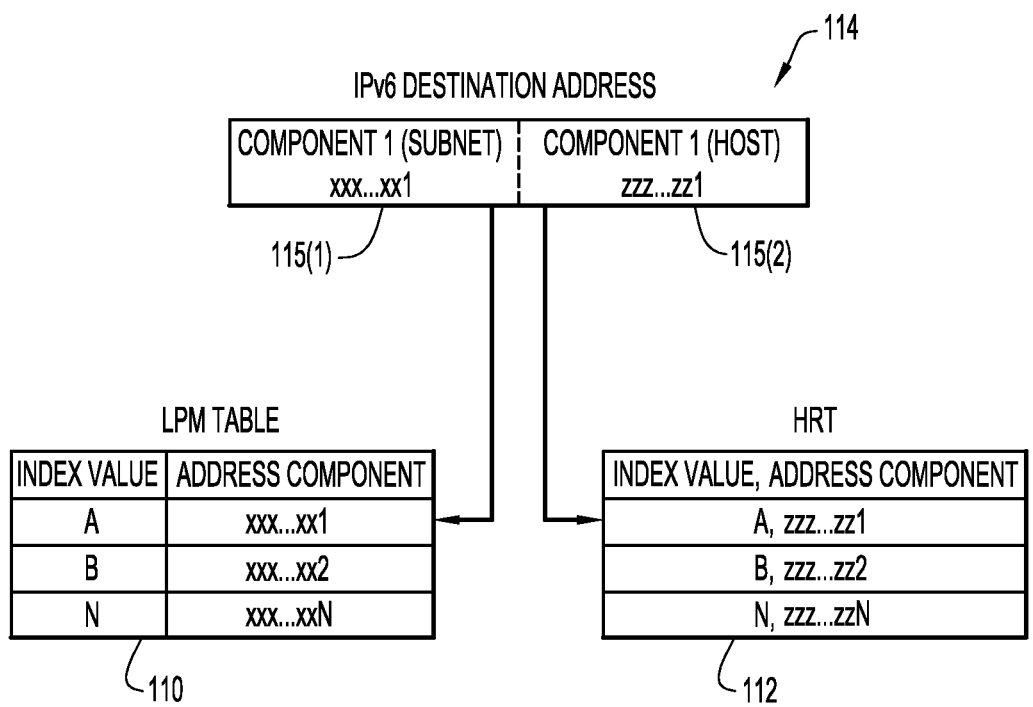
FIG. 2 shows an example of a first database of the switch device that is configured to store first address components of the host devices and a second database of the switch device that is configured to store second address components of the host devices.

Reference is now made to FIG. 2. FIG. 2 shows an example address 114 of a host device in the network 100. In the above example, if VM 1 is sending a data packet destined for VM 4, the target address 114 in FIG. 2 represents the address associated with VM 4, though it should be appreciated that the address 114 in FIG. 2 may represent the address for any virtual machine in the network 100. The target address 114 may be, for example, a 32 bit IP version 4 (IPv4) address or a 128 bit IP version 6 (IPv6) address, though it should be appreciated that the destination address 114 may represent addresses (IP address or other address) having any number of bits. For simplicity, IPv6 addresses are described herein as simply an example. FIG. 2 shows the target address 114 as an IPv6 address having a first component 115(1) and a second component 115(2). The first component 115(1) of the IPv6 destination address 114 denotes the subnet (or virtual local area network (VLAN)) in which the destination host (VM 4) resides. The second component 115(2) of the IPv6 destination address 114 denotes the host address associated with VM 4.

Upon receiving the packet, the ToR switch looks up each address component in the LPM table and the HRT to route the packet accordingly. As stated above, this address information is stored in the respective databases during the exchange of control packets between the host device and the ToR switches.

Traditionally, when a ToR switch receives a control packet, the ToR switch will evaluate the packet for the destination address 114 and will store the a portion of the destination address 114 (e.g., a subnet prefix portion of the destination address 114) in the first database 110 (LPM table) and will store the entire destination address 114 in the second database 112 (HRT). The LPM table is typically accessed by a processor of the ToR switch in order to identify the subnet or VLAN component of the destination address 114 (e.g., for glean operations and/or conversational packet lookup operations). The HRT is generally referred to as an "exact match table" and is typically accessed by the processor of the ToR switch in order to determine the interface identifier of the destination host device.

Thus, when the conventional address storage techniques are utilized, for an IPv4 address, the subnet prefix portion of the 32 bit IPv4 address is stored in the LPM table and the entire 32 bit address is stored in the HRT. Likewise, for an IPv6 address, the subnet prefix portion of the 128 bit IPv6 address is stored in the LPM table and the entire 128 bit address is stored in the HRT. As network devices and standards migrate towards implementing IPv6 standards, the conventional techniques are problematic since they have limitations as to the number of IPv6 addresses that can be stored in the LPM table and HRT of the ToR switches. That is, since IPv6 addresses utilize the larger 128 bit address information, traditional techniques of storing the subnet prefix in the LPM table and the entire address in the HRT will limit the storage capacity of these databases, especially when compared to the smaller 32 bit IPv4 addresses. In other words, the LPM table and HRT will be able to store significantly fewer IPv6 addresses compared to IPv4 addresses. Thus, if traditional address storage techniques are used for IPv6 addresses, the ToR switches will be able to route communications only to a limited number of host devices, due to the reduced address storage capacity in the LPM table and HRT.

The techniques described herein alleviate the limitations of these traditional techniques. In particular, the techniques herein involve compressing the storage of the IPv6 addresses in the LPM and HRT. Subnet and/or VLAN information is still stored in the LPM table, and the interface identifier information of host devices is still stored in the HRT, thus allowing the processor of the ToR switch to utilize known packet routing techniques.

The storage of the address information in the ToR switch databases is optimized by storing components of the address information in each of the databases. For example, as shown in FIG. 2, the first address component 115(1) of the address 114 is stored in the first database 110 (the LPM table). The first address component is mapped to an index value that is also stored in the LPM table. For example, as stated above, since subnet information is always stored in the LPM table, the first address component 115(1) "xxx . . . xx1" comprises the subnet information of the address 114 and is mapped to an index value "A." That is, in one embodiment of the techniques described herein, only the component of the destination address that comprises the subnet information is stored in the LPM table, and that component is compressed (e.g., mapped) to the index value. FIG. 2 also shows other components in the LPM table that are mapped to other index values. The ToR switch can perform a look-up of these addresses and index values in the LPM table and the HRT for data communications exchanged between host devices.

The second address component 115(2) of a host device is stored in the second database 112 (HRT). The second address component 115(2) is stored along with the index value that represents the compressed first address component 115(1). In one example, the second address component 115(2) "zzz . . . zz1" comprises the remainder portion of the address 114 that does not include the subnet information (e.g., since that information is stored in the LPM table and is mapped to the index value). The HRT, thus, stores the index value and the second address component, and together, the index value and the second address component represent the entire address 114. That is, the address 114 in the HRT is compressed into two portions: (1) an index value "A" (mapped to a first component of the destination address 114) and (2) the second address portion 115(2) of the destination address 114. By compressing the address 114, the HRT is able to store a larger number of host addresses compared to when the first address component and the second address component are both stored in the HRT. Likewise, by storing only the first address component in the LPM table, the LPM table is also able to store a larger number of host addresses compared to when the first address component and the second address component are both stored in the LPM table.

As stated above, IPv6 addresses are 128 bits long, and, in one example, when the address is an IPv6 address, the first address portion 115(1) may be 64 bits (e.g., corresponding to a 64 bit subnet prefix) and the second address portion 115(2) may also be 64 bits (e.g., corresponding to a 64 bit host interface identity), though it should be appreciated that the entire address may be divided into portions of any bit length.

Figure 3:
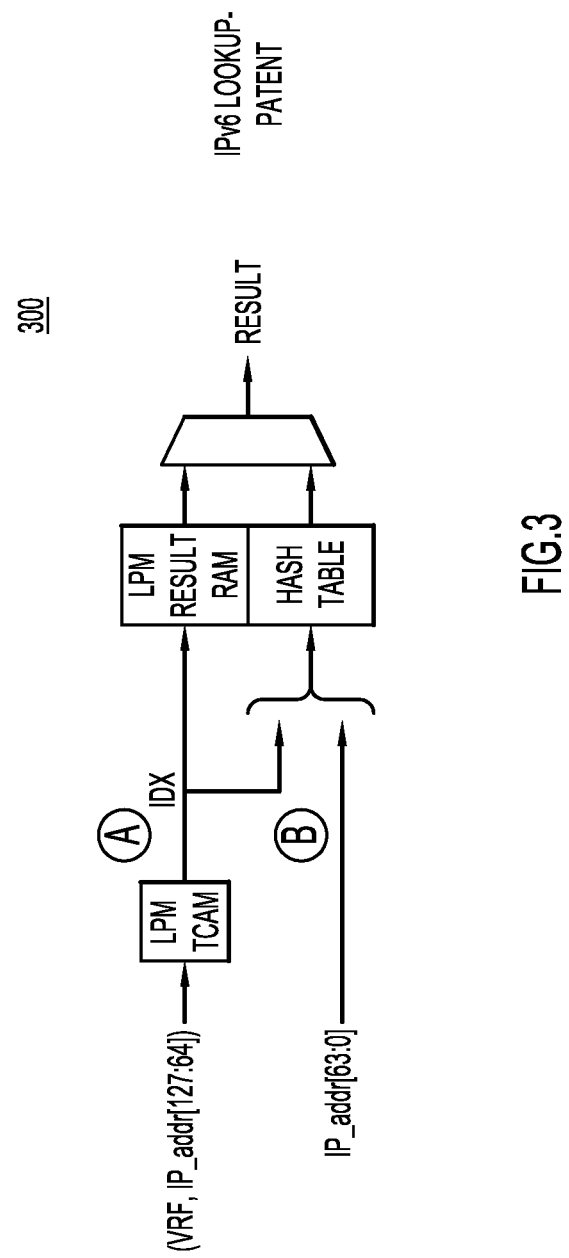
FIG. 3 shows an example logic diagram of the switch device accessing the first database and the second database to retrieve the first and second address components of the host devices.

Reference is now made to FIG. 3, which shows an example logic diagram 300 of a ToR switch retrieving the first and second address components of a destination host device. FIG. 3 is described together with FIG. 1. Referring back to FIG. 1, as the virtual machines 106(1)-106(n) exchange packets with each other, the ToR switches 108(1) and 108(2) utilize the compression techniques described above to store address information associated with the virtual machines 106(1)-106(n). For example, when VM 1 sends a packet destined for VM 4, ToR switch 1 receives the packet from server 1 (which hosts VM 1). ToR switch 1 evaluates the packet to determine the target address (associated with VM 4). Upon determining the target address, ToR switch 1 determines the first address component (e.g., corresponding to the subnet and/or VLAN of VM 4) and the second address component (e.g., corresponding to the interface identifier associated with VM 4). ToR switch 1 then examines its first database (e.g., the LPM table) 110 to determine whether the first address component is stored in the first database. If ToR switch 1 locates the first address component in its LPM table, ToR switch 1 retrieves the index value that is mapped to the first address component. This operation is shown at reference numeral A in FIG. 3. Upon retrieving the index value that is mapped to the first address component, ToR switch 1 then uses the index value together with the second address component to look-up the destination address in the HRT. This operation is shown at reference numeral B in FIG. 3. That is, the index value that ToR switch 1 retrieves from the LPM table is used as a "key" together with the second address component to ultimately retrieve the destination address from the HRT. After the target address is determined from the HRT, ToR switch 1 determines a next-hop adjacency address for the packet and sends the packet to ToR switch 2 associated with the next-hop adjacency address (through the spine switch 109). The next-hop adjacency address may be determined, for example, from the HRT.

If, however, ToR switch 1 does not locate the first address component in its LPM table, ToR switch 1 performs the address compression techniques described above to store the first address component and the second address component in the LPM table and HRT, respectively. At the same time, if the packet is not found in the LPM table, the packet is either dropped by ToR switch 1 if there is no default entry in the LPM table or forwards the packet to a gateway router if there is a default entry in the LPM table.

Figure 4:
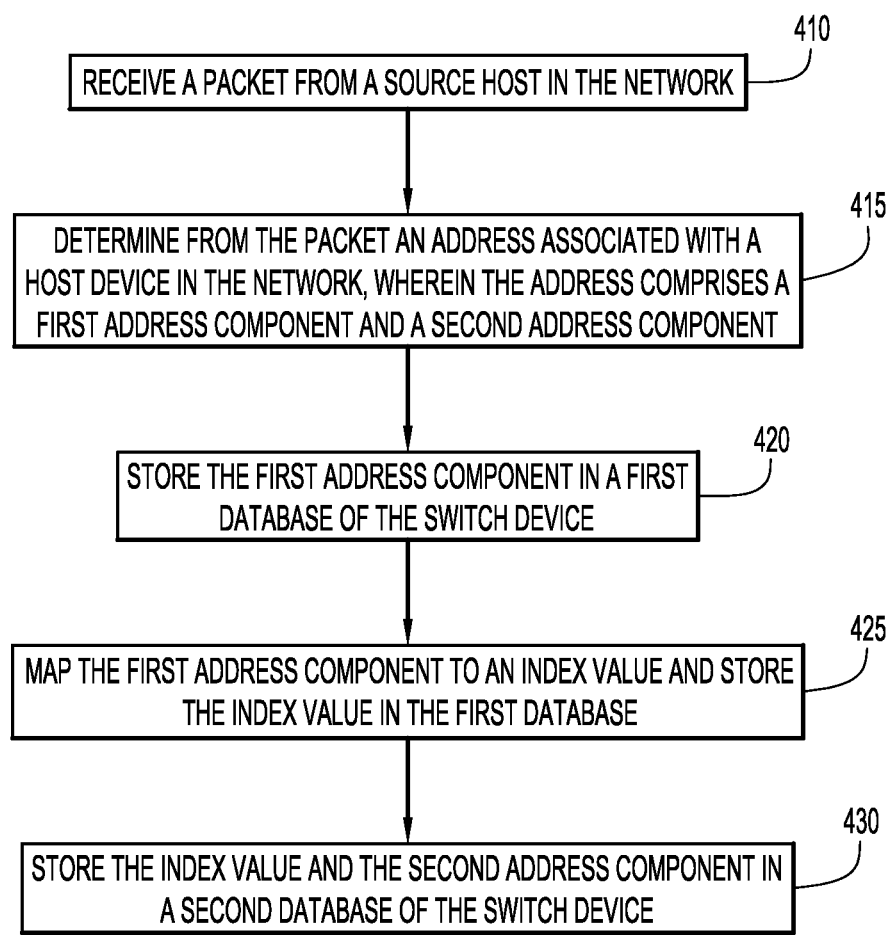
FIG. 4 shows an example flow chart depicting operations performed by the switch device to store the first and second address components of a received packet in respective first and second databases of the switch device.

Reference is now made to FIG. 4. FIG. 4 shows an example flow chart 400 depicting operations performed by a ToR switch to store the first and second address components in respective first and second databases. At operation 410, a switch device (e.g., ToR switch 1) receives a packet from a source host (e.g., a source virtual machine) in the network. The switch device, at operation 415 determines from the packet an address associated with a destination host in the network. The address comprises a first address component and a second address component. The first address component is stored (e.g., for a look-up match), at operation 420, in a first database (e.g., the LPM table) of the switch device. At operation 425, the first address component is mapped to an index value, and the index value is stored in the first database. At operation 430, the index value and the second address component is stored (e.g., for a look-up match) in a second database (e.g., the HRT) of the switch device.

Figure 5:
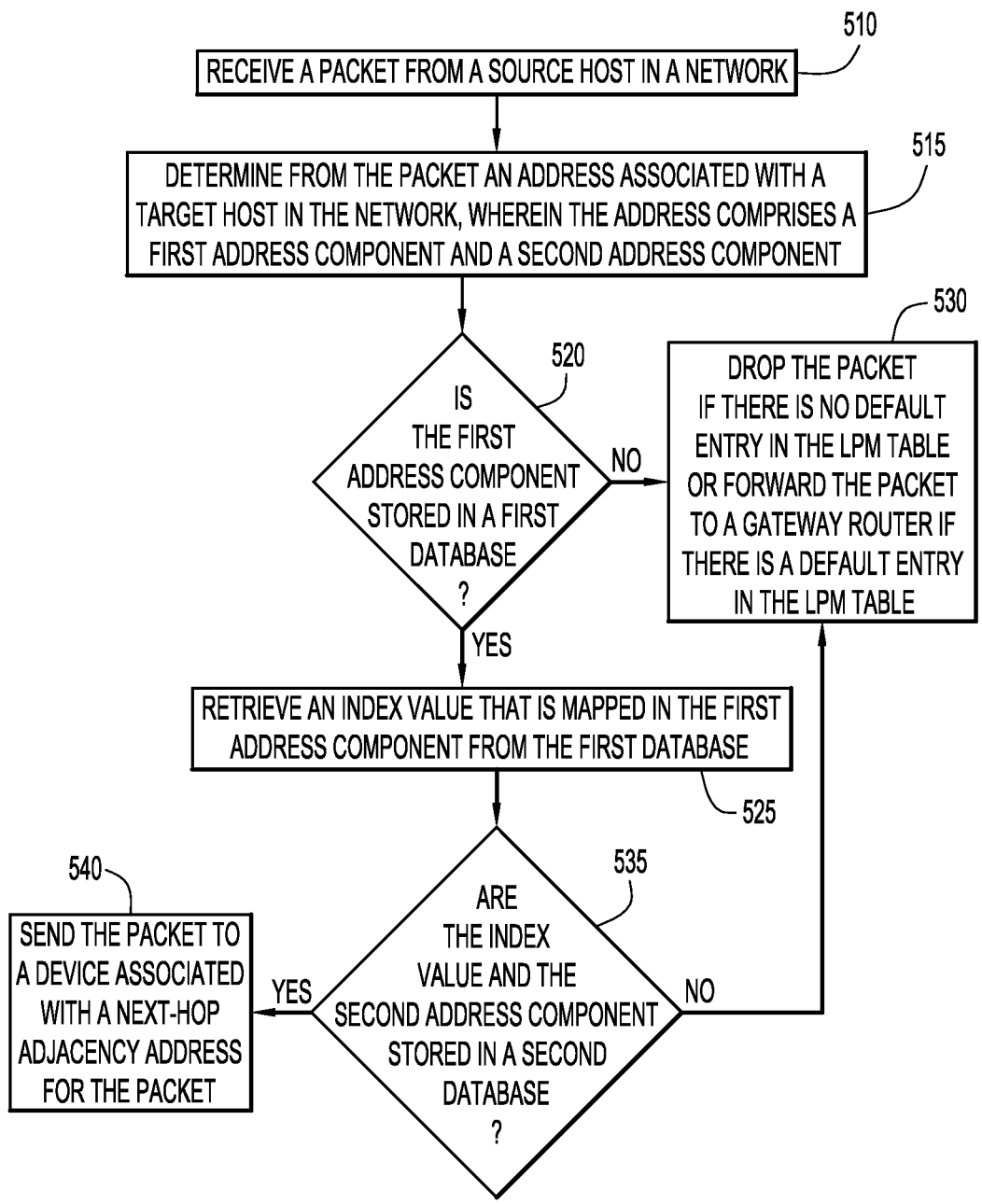
FIG. 5 shows an example flow chart depicting operations performed by the switch device to retrieve the first and second address components of a received packet from the respective first and second databases of the switch device.

Reference is now made to FIG. 5. FIG. 5 shows an example flow chart 500 that depicts operations performed by a ToR switch to retrieve the first and second address components of a received packet. At operation 510, the switch device receives a packet from a source host in a network. The switch device then determines from the packet, at operation 515, an address associated with a destination host in the network. The address comprises a first address component and a second address component. At operation 520, the switch device determines whether the first address component is stored in a first database (e.g., the LPM table) of the switch device. If the first address component is stored in the first database, the switch device, at operation 525, retrieves from the first database an index value that is mapped to the first address component. If the first address component is not stored in the first database, the switch device, at operation 530, either drops the packet if there is no default entry in the LPM or forwards the packet to a gateway router if there is a default entry in the LPM. At operation 535, after the switch device retrieves the index value, the switch device determines whether the index value and the second address component are stored in a second database. If so, the switch device, at operation 540, sends the packet to a device associated with a next-hop adjacency address for the packet. If not, the switch device reverts to operation 530 to drop the packet or forward the pack to the gateway router.

Figure 6:
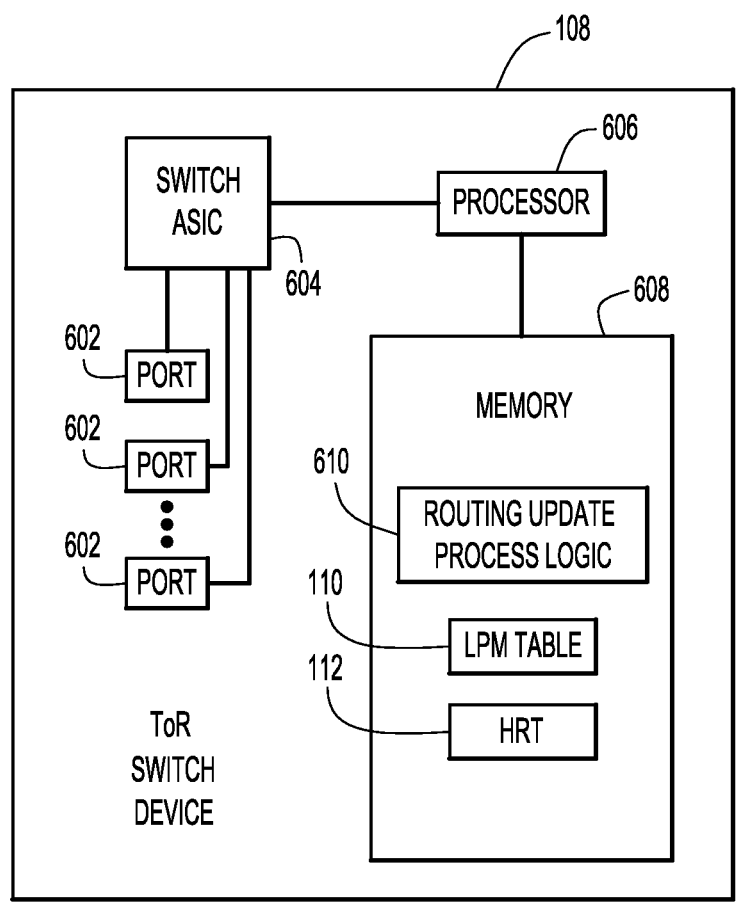
FIG. 6 shows an example block diagram of the switch device that is configured to store the first and second address components of packets in the respective first and second database.

Reference is now made to FIG. 6. FIG. 6 shows an example block diagram of a ToR switch device. For simplicity, the ToR switch device in FIG. 6 is shown at reference numeral 108, though it should be appreciated that the ToR switch device 108 may be any of the ToR switch devices in the network 100. The ToR switch device 108 comprises, among other components, a plurality of network ports 602, a switch application specific integrated circuit (ASIC) unit 604, a processor 606 and a memory 608. The ports 602 are configured to receive communications (e.g., packets) from devices in the network 100 and to send communications to devices in the network 100. For example, the ports 602 may be configured to send/ receive data packets to/from the servers 104(1)-104(m) and to/from the spine switch 108. The ports are coupled to the switch ASIC 604. The switch ASIC 604 enables packets received by the ToR switch device 108 to be forwarded to the appropriate device in the network 100. For example, when the ToR switch device 108 receives a packet at a first port, the switch ASIC 604 determines a second port on which the packet should be forwarded in the network. That is, if a packet is received at the first port from server 1, the switch ASIC 604 may determine to forward the packet to the second port, which services the spine switch 109.

The switch ASIC 604 is coupled to the processor 606. The processor 606 is, for example, a microprocessor or microcontroller that is configured to execute program logic instructions (i.e., software) for carrying out various operations and tasks of the ToR switch device 108, as described herein. For example, the processor 606 is configured to execute routing update process logic 610 to compress the address information associated with host devices by accessing the LPM database 110 and the HRT 112 stored in the memory unit 608 of the ToR switch 108. The memory unit 608 is configured to store information associated with subnet routes, host routes and default routes of received packets (e.g., in the LPM database 110 and/or the HRT 112). The functions of the processor 606 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 608 may comprise read only memory (ROM), random access memory (RAM), magnetic disk storage media devices, optical storage media devices, flash memory devices, electrical, optical, or other physical/tangible (non-transitory) memory storage devices. The memory 608 stores software instructions for the routing update process logic 610. The memory 608 also stores the LPM table 110 and the HRT 112. The LPM table 110 and the HRT 112 may be stored in a ternary content addressable memory (TCAM) component of the memory 608. Thus, in general, memory 608 may comprise one or more computer readable storage media (e.g., a memory storage device) encoded with software comprising computer executable instructions and when the software is executed (e.g., by the processor 206), it is operable to perform the operations described herein for the packet forwarding process logic 610.

The routing update process logic 610 may take any of a variety of forms, so as to be encoded in one or more tangible computer readable memory media or storage devices for execution, such as fixed logic or programmable logic (e.g., software/computer instructions executed by a processor). In one example, the routing table process logic 610 may be stored in a memory component of the switch ASIC 604. The processor 606 may be an ASIC that comprises fixed digital logic, or a combination thereof.

For example, the processor 606 may be embodied by digital logic gates in a fixed or programmable digital logic integrated circuit, which digital logic gates are configured to perform the routing table process logic 610. In general, the routing update process logic 610 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by one or more of the ToR switches may be performed by one or more computer or machine readable storage media (non-transitory) or device executed by a processor and comprising software, hardware or a combination of software and hardware to perform the techniques described herein.

In summary, a method is provided comprising: at a switch device in a network, receiving a control packet from a source host in the network; determining from the control packet an address associated with a host in the network, wherein the address comprises a first address component and a second address component; storing the first address component in a first database of the switch device; mapping the first address component to an index value and storing the index value in the first database; and storing the index value and the second address component in a second database of the switch device.

In addition, a method is provided comprising: at a switch device in a network, receiving a data packet from a source host in the network; determining from the data packet an address associated with a target host in the network, wherein the address comprises a first address component and a second address component; examining a first database of the switch device to determine whether the first address component of a target host address is stored in the first database; if the first address component is determined to be stored in the first database, retrieving from the first database an index value that is mapped to the first address component and examining a second database of the switch device to determine whether the index value and the second address component are stored in the second database.

Furthermore, an apparatus is provided comprising: a plurality of network ports; a switch unit coupled to the plurality of network ports; a memory; and a processor coupled to the switch unit and the memory and configured to: receive a control packet from a source host in the network; determine from the control packet an address associated with a destination host in the network, wherein the address comprises a first address component and a second address component; store the first address component in a first database; map the first address component to an index value and store the index value in the first database; and store the index value and the second address component in a second database.

In addition, one or more computer readable storage media encoded with software is provided comprising computer executable instructions and when the software is executed operable to: receive a control packet from a source host in the network; determine from the control packet an address associated with a host in the network, wherein the address comprises a first address component and a second address component; store the first address component in a first database of the switch device; map the first address component to an index value and store the index value in the first database; and store the index value and the second address component in a second database of the switch device.

The above description is intended by way of example only. Various modifications and structural changes may be made therein without departing from the scope of the concepts described herein and within the scope and range of equivalents of the claims.

What is claimed is:

1. A method comprising:
   at a switch device in a network: receiving a control packet from a source host in the network;
   determining from the control packet an Internet Protocol (IP) address associated with a host in the network, wherein the IP address is divided into a first IP address component that is a subnet associated with the host and a second IP address component that is an interface identifier of the host;
storing the first IP address component in a first database that is a longest prefix match (LPM) database of the switch device;
mapping the first IP address component to an index value that together with the second IP address represents the host IP address and storing the index value in the first database;
storing the index value and the second IP address component in a second database that is a host routing table (HRT) of the switch device;
receiving a data packet including an IP address including a target subnet associated with a target host and a target interface identifier of the target host; and
searching the LPM database for the target subnet and, upon finding the target subnet: retrieving from the LPM database an index value mapped to the target subnet; and searching the HRT for the index value and the target interface identifier that together represent the target host IP address; and
upon finding the index value and the target interface identifier in the HRT:
determining a next-hop adjacency address for the data packet; and
sending the data packet to a device associated with the next-hop adjacency address.

2. The method of claim 1, wherein receiving comprises receiving the control packet having an Internet Protocol version 6 (IPv6) address associated with the host.

3. The method of claim 1, wherein storing the index value and the second address component comprises storing the index value and the second address component in the second database of the switch device such that the second database is able to store a larger number of host addresses compared to when the first address component and the second address component are stored in the second database.

4. The method of claim 1, wherein the first address component has a length of 64 bits or more for subnet address.

5. The method of claim 1, wherein a look-up in the first database and another look-up in the second database address component together have a length of 128 bits.

6. The method of claim 1, further comprising:
if the first address component is determined to be stored in the first database and if the index value and the second address component are determined to not be stored in the second database, determining a next-hop adjacency address for the packet from the first database; and
sending the packet to a device associated with the next-hop adjacency address.

7. The method of claim 1, further comprising dropping the packet when there is no default entry in the first database or forwarding the packet to a gateway router when there is a default entry in the first database.

8. The method of claim 1, wherein only first IP address components of IP addresses and indexes mapped to and representative of corresponding ones of the first IP address components are stored in the LPM database.

9. An apparatus comprising:
a plurality of network ports;
a switch unit coupled to the plurality of network ports;
a memory; and
a processor coupled to the switch unit and the memory, and configured to:

receive a control packet from a source host in the network;
determine from the control packet an Internet Protocol (IP) address associated with a host in the network, wherein the IP address is divided into a first IP address component that is a subnet associated with the host and a second IP address component that is an interface identifier of the host;
store the first IP address component in a first database that is a longest prefix match (LPM) database;
map the first IP address component to an index value that together with the second IP address represents the host IP address and storing the index value in the first database;
store the index value and the second IP address component in a second database that is a host routing table (HRT);
receive a data packet including an IP address including a target subnet associated with a target host and a target interface identifier of the target host; and
search the LPM database for the target subnet and, upon finding the target subnet: retrieve from the LPM database an index value mapped to the target subnet; and search the HRT for the index value and the target interface identifier that together represent the target host IP address; and
upon finding the index value and the target interface identifier in the HRT:
determine a next-hop adjacency address for the data packet; and
send the data packet to a device associated with the next-hop adjacency address.

10. The apparatus of claim 9, wherein the processor is further configured to store the index value and the second address component in the second database such that the second database is able to store a larger number of host addresses compared to when the first address component and the second address component are stored in the second database.

11. The apparatus of claim 9, wherein the LPM database stores only first IP address components of IP addresses and indexes mapped to and representative of corresponding ones of the first IP address components.

12. A non-transitory computer-readable storage media encoded with software comprising computer executable instructions and when the software is executed operable to:
receive a control packet from a source host in network;
determine from the control packet an Internet Protocol (IP) address associated with a host in the network, IP address is divided into a first IP address component that is a subnet associated with the host and a second IP address component that is an interface identifier of the host;
store the first address component in a first database that is a longest prefix match (LPM) database of switch device;
map the first IP address component to an index value that together with the second IP address represents the host IP address and storing the index value in the first database; store the index value and the second IP address component in a second database that is a host routing table (HRT) of the switch device;
receive a data packet including an IP address including a target subnet associated with a target host and a target interface identifier of the target host; and
search the LPM database for the target subnet and, upon finding the target subnet: retrieve from the LPM database an index value mapped to the target subnet; and search the HRT for the index value and the target interface identifier that together represent the target host IP address; and upon finding the index value and the target interface identifier in the HRT:

determine a next-hop adjacency address for the data packet; and send the packet to a device associated with the next-hop adjacency address.

13. The computer-readable storage media of claim 12, wherein the instructions operable to store the index value and the second address component in the second database comprise instructions operable to store the index value and the second address component in the second database such that the second database is able to store a larger number of host addresses compared to when the first address component and the second address component are stored in the second database.

14. The computer-readable storage media of claim 12, wherein the LPM database stores only first IP address components of IP addresses and indexes mapped to and representative of corresponding ones of the first IP address components.

* * * * *